United States Patent
St. Pierre et al.

(10) Patent No.: US 12,037,943 B2
(45) Date of Patent: Jul. 16, 2024

(54) WASTE HEAT RECOVERY SYSTEM

(71) Applicant: General Electric Company, Schenectady, NY (US)

(72) Inventors: Ryan St. Pierre, Jacksonville, FL (US); Kevin Edward Hinderliter, Cincinnati, OH (US); Michael Vadnais, Milwaukee, WI (US)

(73) Assignee: General Electric Company, Schenectady, NY (US)

(*) Notice: Subject to any disclaimer, the term of this patent is extended or adjusted under 35 U.S.C. 154(b) by 212 days.

(21) Appl. No.: 17/961,667

(22) Filed: Oct. 7, 2022

(65) Prior Publication Data
US 2024/0117766 A1 Apr. 11, 2024

(51) Int. Cl.
*F02C 7/10* (2006.01)
*F02C 3/04* (2006.01)

(52) U.S. Cl.
CPC .............. *F02C 7/10* (2013.01); *F02C 3/04* (2013.01); *F05D 2220/323* (2013.01); *F05D 2260/213* (2013.01)

(58) Field of Classification Search
CPC ......... F05D 2260/213; F05D 2260/205; F05D 2270/20; F05D 2220/62; F02C 7/185; F02C 7/18; F02C 7/12; F02C 7/14; F02C 7/16; F02C 7/10; F02C 7/224; F02K 3/115; F28D 2021/0021
See application file for complete search history.

(56) References Cited

U.S. PATENT DOCUMENTS

| | | | |
|---|---|---|---|
| 2,516,910 A | 8/1950 | Redding | |
| 2,599,879 A * | 6/1952 | Daniel | F02C 7/18 60/264 |
| 3,528,250 A | 9/1970 | Johnson | |
| 3,735,588 A * | 5/1973 | Moskowitz | F28F 9/013 165/162 |
| 5,119,624 A | 6/1992 | McKenna | |
| 7,254,937 B2 * | 8/2007 | Hull | F02C 7/08 60/39.511 |
| 8,181,443 B2 * | 5/2012 | Rago | F02C 7/12 60/226.3 |

(Continued)

FOREIGN PATENT DOCUMENTS

GB 2041090 A 9/1980

OTHER PUBLICATIONS

U.S. Appl. No. 17/470,032, filed Sep. 9, 2021.

*Primary Examiner* — Craig Kim
(74) *Attorney, Agent, or Firm* — Dority & Manning, P.A.

(57) ABSTRACT

A gas turbine engine includes a compressor section, a combustion section, a turbine section, and an exhaust section in serial flow order and together defining a core air flowpath. The gas turbine engine also includes a turbine rear frame extending through the core air flowpath at a location downstream of the turbine section and defining a leading edge within the core air flowpath. The gas turbine engine also includes a waste heat recovery system operable to separate, at or upstream of the leading edge of the turbine rear frame, a core airflow exiting the turbine section into a primary exhaust airflow and a waste heat recovery airflow. The waste heat recovery system comprises a heat source exchanger positioned to receive the waste heat recovery airflow.

18 Claims, 9 Drawing Sheets

(56) References Cited

U.S. PATENT DOCUMENTS

| | | | |
|---|---|---|---|
| 8,516,791 B2* | 8/2013 | Perveiler | F02C 7/14 60/262 |
| 8,961,114 B2 | 2/2015 | Ruthemeyer | |
| 9,068,506 B2 | 6/2015 | Eleftheriou et al. | |
| 9,429,075 B2 | 8/2016 | Amin et al. | |
| 9,435,258 B2 | 9/2016 | Janapaneedi et al. | |
| 9,464,594 B2 | 10/2016 | Pesyna | |
| 9,650,147 B2 | 5/2017 | Selchert et al. | |
| 9,677,501 B2 | 6/2017 | Pierluissi et al. | |
| 9,845,768 B2 | 12/2017 | Pesyna et al. | |
| 10,260,371 B2 | 4/2019 | Youssef et al. | |
| 10,451,084 B2* | 10/2019 | Subramanian | F04D 29/542 |
| 10,683,804 B2 | 6/2020 | Descubes et al. | |
| 10,927,761 B2 | 2/2021 | Rambo | |
| 10,941,706 B2 | 3/2021 | Sen et al. | |
| 11,015,534 B2* | 5/2021 | Smith | F02C 7/16 |
| 11,125,165 B2 | 9/2021 | Niergarth et al. | |
| 11,391,211 B2* | 7/2022 | Smith | F02C 7/224 |
| 11,725,530 B1* | 8/2023 | Subramanian | F01D 5/145 415/191 |
| 2005/0235626 A1* | 10/2005 | Hull | F28D 7/0058 60/39.511 |
| 2005/0235627 A1* | 10/2005 | Vandermolen | F02C 7/08 60/39.511 |
| 2013/0219918 A1* | 8/2013 | Suciu | F02C 7/185 60/785 |
| 2013/0219919 A1* | 8/2013 | Suciu | F01D 9/065 60/785 |
| 2013/0255268 A1 | 10/2013 | Eleftheriou et al. | |
| 2014/0102105 A1 | 4/2014 | Janapaneedi et al. | |
| 2014/0208766 A1 | 7/2014 | Amin et al. | |
| 2016/0369695 A1 | 12/2016 | Perlak et al. | |
| 2017/0114721 A1* | 4/2017 | Miller | F02C 7/185 |
| 2017/0122210 A1* | 5/2017 | Schwarz | F28D 7/1676 |
| 2017/0138372 A1* | 5/2017 | Subramanian | F01D 9/041 |
| 2017/0159566 A1* | 6/2017 | Sennoun | F02C 7/185 |
| 2017/0184024 A1* | 6/2017 | Sennoun | F02C 3/04 |
| 2017/0335715 A1 | 11/2017 | Youssef et al. | |
| 2019/0153953 A1* | 5/2019 | Niergarth | F02C 7/224 |
| 2019/0186361 A1 | 6/2019 | Gerstler et al. | |
| 2019/0204010 A1* | 7/2019 | Breeze-Stringfellow | F28F 13/08 |
| 2019/0359339 A1 | 11/2019 | Pachidis et al. | |
| 2019/0359340 A1 | 11/2019 | Pachidis et al. | |
| 2020/0088098 A1 | 3/2020 | Roberge | |
| 2020/0165974 A1* | 5/2020 | Smith | F02C 7/18 |
| 2020/0165982 A1* | 5/2020 | Smith | F02C 7/14 |
| 2020/0200085 A1 | 6/2020 | Perlak et al. | |
| 2020/0224557 A1* | 7/2020 | McAuliffe | F01K 23/02 |
| 2020/0224588 A1* | 7/2020 | Somanath | F02C 6/02 |
| 2020/0224589 A1 | 7/2020 | McAuliffe et al. | |
| 2020/0224590 A1 | 7/2020 | McAuliffe et al. | |
| 2021/0222619 A1 | 7/2021 | Boucher et al. | |
| 2021/0340914 A1 | 11/2021 | Niergarth et al. | |
| 2022/0251971 A1* | 8/2022 | Pazinski | F01D 25/12 |
| 2022/0255396 A1* | 8/2022 | Pazinski | H02K 7/1823 |
| 2022/0307418 A1* | 9/2022 | Vitt | F02C 7/141 |

\* cited by examiner

WASTE HEAT RECOVERY SYSTEM

FIELD

The present subject matter relates generally to a waste heat recovery system for a gas turbine engine and a method for operating the same.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts. During operation of the gas turbine engine, a relatively large amount of heat energy is generated through the compression process by the compressors and through the combustion process within the combustor. A substantial portion of the heat energy is extracted through the one or more turbines while a portion of such heat energy is exhausted to atmosphere.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
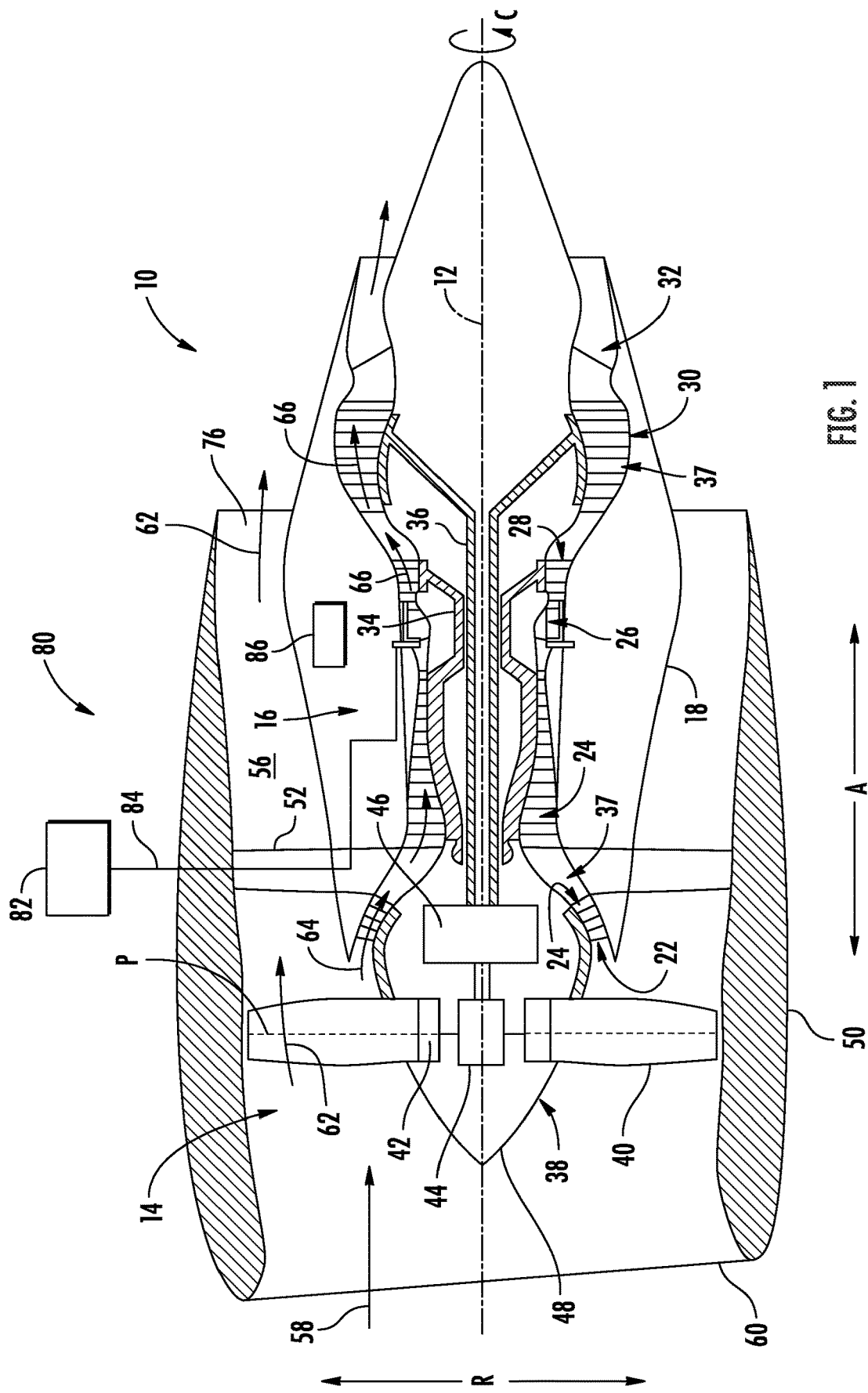
FIG. 1 is a schematic, cross-sectional view of an exemplary gas turbine engine according to various embodiments of the present subject matter.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper" and "lower", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The term "at least one of" in the context of, e.g., "at least one of A, B, and C" refers to only A, only B, only C, or any combination of A, B, and C.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The present disclosure is generally related to an exhaust section of a gas turbine engine having a primary exhaust flowpath and a waste heat recovery flowpath. The gas turbine engine of the present disclosure further includes a waste heat recovery system including a heat source exchanger positioned in thermal communication with the waste heat recovery flowpath, such as positioned within a portion of the waste heat recovery flowpath. Further, a first portion of an airflow that exits a turbine section of the gas turbine engine during operation of the gas turbine engine travels through the primary exhaust flowpath and a second portion of an airflow that exits the turbine section during operation of the gas turbine engine is directed to the waste heat recovery flowpath.

A turbine rear frame extends through a core air flowpath at a location downstream of the turbine and defines a leading edge within the core air flowpath. A core airflow exiting the turbine section of the engine is separated, at or upstream of the leading edge of the turbine rear frame, into a waste heat recovery airflow and a primary exhaust airflow. The waste heat recovery airflow is routed to a heat source exchanger that may be coupled to or integrated completely or partially with the turbine rear frame, thereby limiting the ingestion of wakes into the heat source exchanger that might otherwise be caused by the turbine rear frame. Further, according to embodiments of the present disclosure, the waste heat recovery flowpath is created at or upstream of the leading edge of the turbine rear frame and radially outward in the core air flowpath such that the waste heat recovery flowpath captures portions of the core airflow that leak over the tips or radially outward ends of the turbine blades of the last rotating stage of the turbine section. That portion of the core airflow that leaks over the tips of the last rotating stage of the turbine section is at a higher temperature and pressure than portions of the core airflow that did not leak over the tips of the last rotating stage of the turbine section. The waste heat recovery flowpath is radially and axially located to capture that leaking portion of the core airflow, thereby enabling more efficient use of that portion of the core airflow via the heat source exchanger. Further, by capturing that portion of the core airflow that leaks over the tips of the last rotating stage of the turbine section and routing that portion of the core airflow to the heat source exchanger, only a fraction of the total core airflow is routed through the heat source exchanger, thereby minimizing system-level penalties associated with the heat source exchanger.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or axis 12 provided for reference), a radial direction R, and a circumferential direction C extending about the longitudinal axis 12. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section, also referred to herein as an exhaust section, 32. The compressor section, the combustion section 26, the turbine section, and the exhaust section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, the disk 42, and the actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the turbomachine 16. The outer nacelle 50 is supported relative to the turbomachine 16 by a plurality of circumferentially-spaced outlet guide vanes 52. Moreover, the outer nacelle 50 extends over an outer portion of the turbomachine 16 so as to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the exhaust section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust.

Further, the exemplary turbofan engine 10 includes a fuel delivery system 80 providing a flow of fuel to the combustion section 26 of the turbofan engine 10. The fuel delivery system 80 generally includes a fuel source 82 and a plurality of fuel lines 84. The fuel source 82 may be, e.g., a fuel tank positioned within a fuselage or one or more wings of an aircraft including the turbofan engine 10. Additionally, the one or more fuel lines 84 extend from the fuel source 82 to one or more fuel nozzles (not shown) within the combustion section 26.

Further, still, the exemplary turbofan engine 10 depicted includes a waste heat recovery system 86. As will be explained in greater detail below, the waste heat recovery system may generally be configured to extract heat from an airflow through the exhaust section 32 (and/or through sections of the turbine section) and provide such heat to one or both of the fuel delivery system 80 (such as to a fuel flow through the one or more fuel lines 84), the compressor section (such as a downstream end of the HP compressor 24), or both.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may include any suitable number of compressors, turbines (such as an intermediate turbine in addition to an LP and HP turbine), shafts/spools (e.g., one spool, two spools, three spools), etc. Further, in certain exemplary embodiments, aspects of the present disclosure may further apply to any other suitable aeronautical gas turbine engines, such as a turbojet engine, turboshaft engine, turboprop engine, etc. Additionally, in still other exemplary embodiments, the exemplary turbofan engine 10 may not be configured as an aeronautical gas turbine engine, and instead may be configured as an industrial gas turbine engine (e.g., utilized for power generation), a nautical gas turbine engine, etc.

Figure 2:
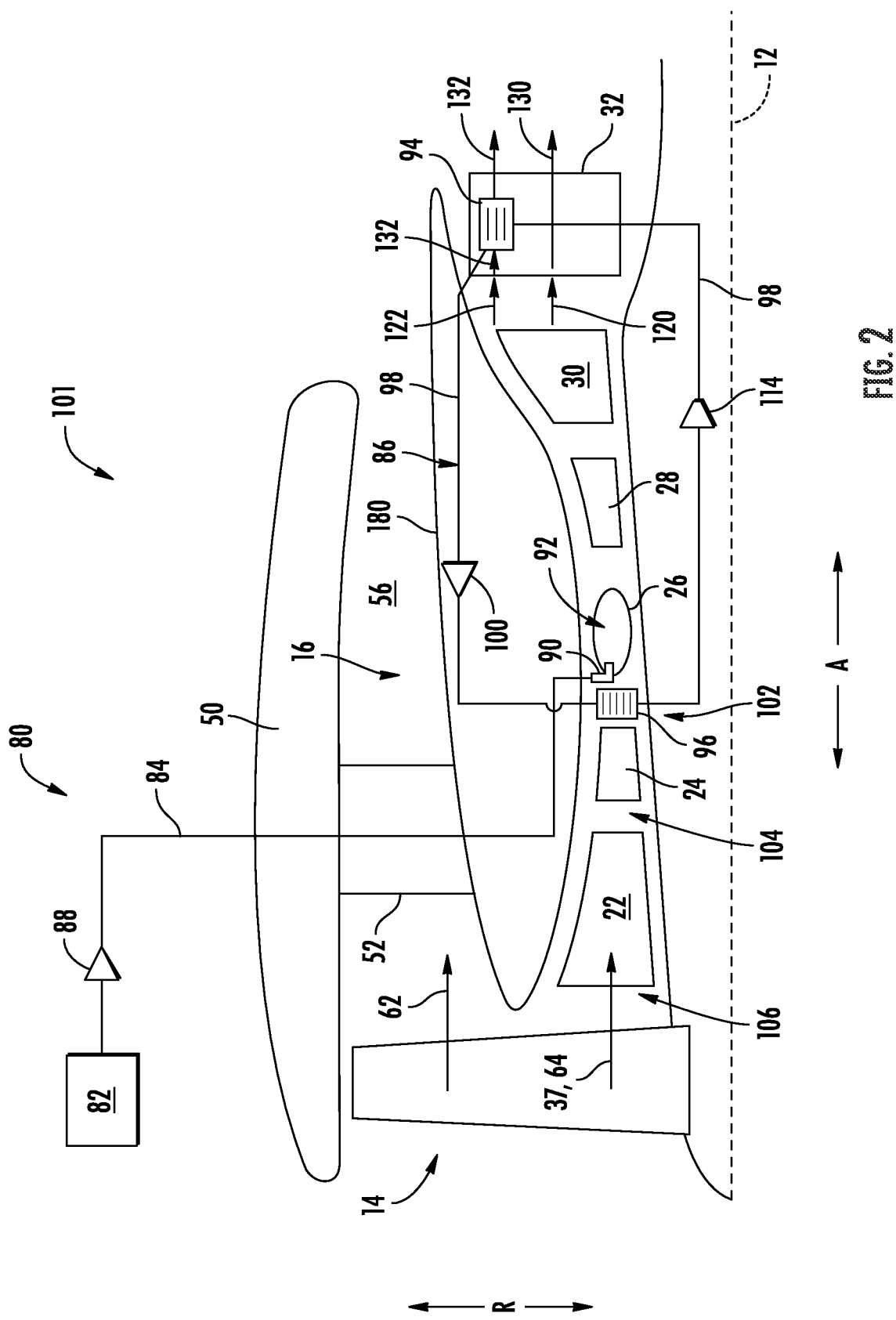
FIG. 2 is a simplified schematic view of a gas turbine engine and a waste heat recovery system in accordance with an exemplary embodiment of the present disclosure.

Referring now to FIG. 2, a simplified, schematic view of a gas turbine engine 101 in accordance with an exemplary aspect of the present disclosure is provided. The exemplary gas turbine engine 101 depicted in FIG. 2 may be configured in substantially the same manner as exemplary turbofan engine 10 described above with reference to FIG. 1.

For example, as is shown, the gas turbine engine 101 generally includes a fan section 14 and a turbomachine 16. The turbomachine 16 includes in serial flow order a compressor section having an LP compressor 22 and an HP compressor 24, a combustion section 26, a turbine section including an HP turbine 28 and an LP turbine 30, and an exhaust section 32. The compressor section, the combustion section 26, the turbine section, and the exhaust section 32 generally define a core air flowpath 37 extending therethrough.

A fuel delivery system 80 is also included for providing a flow of fuel to the combustion section 26 of the gas turbine engine 101, and more specifically to a combustion chamber 92 of the combustion section 26. For example, the fuel delivery system 80 generally includes a plurality of fuel lines 84 and a fuel nozzle 90. The fuel nozzle 90 may receive a flow of fuel from the plurality of fuel lines 84 and further may receive compressed air from the compressor section (e.g., the HP compressor 24). The fuel nozzle 90 may accordingly provide a mixture of compressed air and fuel to the combustion chamber 92, wherein such mixture of compressed air and fuel is combusted to generate combustion gasses. The fuel delivery system 80 generally also includes a fuel source 82 and a pump 88 in fluid communication with the one or more fuel lines 84, the pump 88 configured for increasing a pressure of a fuel flow from the fuel source 82 and through the one or more fuel lines 84.

Moreover, the turbomachine 16 and fan section 14 are at least partially surrounded by an outer nacelle 50, with the turbomachine 16 supported relative to the outer nacelle 50 through a plurality of outlet guide vanes 52. The outer nacelle 50 defines a bypass airflow passage 56 with the turbomachine 16. A first portion 62 of the airflow from the fan section 14 is provided through the bypass airflow passage 56 as a bypass airflow and a second portion 64 of an airflow from the fan section 14 is provided through the turbomachine 16 as a core airflow.

In addition, the exemplary gas turbine engine 101 includes a waste heat recovery system 86. The exemplary waste heat recovery system 86 is generally configured to extract heat from a heat source (e.g., a heat source not fully utilizing the heat being extracted therefrom) and transfer such extracted heat to a heat sink, such that the heat sink may more efficiently utilize such extracted heat.

Referring particularly to the exemplary waste heat recovery system 86 depicted in FIG. 2, the waste heat recovery system 86 includes a primary exhaust flowpath 120 and a waste heat recovery flowpath 122 that is parallel to the primary exhaust flowpath 120. Additionally, the waste heat recovery system 86 also includes a heat source exchanger 94 (i.e., a heat exchanger configured to extract heat for the waste heat recovery system 86 from a heat source of the gas turbine engine 101), a heat sink exchanger 96 (i.e., a heat exchanger configured to transfer heat from the waste heat recovery system 86 to a heat sink of the gas turbine engine 101), a thermal transfer bus 98, and a pump 100. Each of these components are described in greater detail as follows.

For the embodiment shown, the heat source exchanger 94 is in thermal communication with the heat source, which may generally be the turbine section, e.g., which may include the HP turbine 28 and the LP turbine 30, and the exhaust section 32, or both. For example, for the embodiment of FIG. 2, the heat source includes an airflow exiting the turbine section (e.g., which may include the HP turbine 28 and the LP turbine 30). A first portion of the airflow 130 that exits the turbine section, e.g., which may include the HP turbine 28 and the LP turbine 30, travels through the primary exhaust flowpath 120 and a second portion of an airflow 132 that exits the turbine section, e.g., which may include the HP turbine 28 and the LP turbine 30, is directed to the waste heat recovery flowpath 122. As shown in FIG. 2, the heat source exchanger 94 is positioned in thermal communication with the waste heat recovery flowpath 122, and more specifically for the embodiment depicted is positioned within the waste heat recovery flowpath 122. For example, the heat source exchanger 94 may be integrated into a portion of the waste heat recovery flowpath 122 or alternatively may be positioned at any other suitable location in thermal communication with an airflow directed through the waste heat recovery flowpath 122.

Moreover, for the exemplary embodiment depicted, the heat sink exchanger 96 is in thermal communication with the heat sink, which may generally be the compressor section, the fuel delivery system 80, or both. More specifically, for the embodiment depicted, the heat sink exchanger 96 is in thermal communication with the compressor section at a location proximate a downstream end of the compressor section, or more specifically still with a location proximate a downstream end of the HP compressor 24 of the compressor section. It will be appreciated, that as used herein, the term "proximate the downstream end," with reference to the compressor section refers to a location closer to an exit of the compressor section than an inlet to the compressor section and upstream of the combustion chamber 92. Similarly, as used herein, the term "proximate the downstream end," with reference to the HP compressor 24 refers to a location closer to a compressor exit 102 of the HP compressor 24 than an inlet 104 to the HP compressor 24 and upstream of the combustion chamber 92. For example, in certain embodiments, the heat sink exchanger 96 may be integrated into, or coupled to, a strut or guide vane, such as a diffuser, positioned at the compressor exit 102 and upstream of the combustion chamber 92 of the combustion section 26. Additionally, or alternatively, the heat sink exchanger 96 may be integrated into, or coupled to, one or more fuel nozzles 90 of the fuel delivery system 80.

More specifically still, for the embodiment shown, the heat sink exchanger 96 is in thermal communication with the compressor exit 102 of the HP compressor 24 of the gas turbine engine 101. The "compressor exit" refers to an outlet of the HP compressor 24. In such a manner, the heat sink exchanger 96 may add heat to an airflow through the core air flowpath 37 prior to such airflow entering the combustion chamber 92, resulting in a more efficient gas turbine engine 101.

Further, as stated, the waste heat recovery system 86 includes the thermal transfer bus 98. The thermal transfer bus 98 includes a thermal transfer fluid and extends from the heat source exchanger 94 to the heat sink exchanger 96. In such a manner, the thermal bus is configured to transfer the thermal transfer fluid from the heat source exchanger 94 (wherein the thermal transfer fluid has accepted heat from a portion of the airflow exiting the turbine section, e.g., which may include the HP turbine 28 and the LP turbine 30, directed to the waste heat recovery flowpath 122) to the heat sink exchanger 96 (wherein the thermal transfer fluid transfers heat to the airflow through, for the embodiment shown, the compressor exit 102 of the HP compressor 24, or other location upstream of the combustion chamber 92). The thermal transfer bus 98 may include one or more pipes, conduits, etc. arranged in series, parallel, or some combination thereof.

Notably, in at least certain exemplary embodiments the gas turbine engine 101 may define a relatively high overall pressure ratio. As used herein, the term overall pressure ratio refers to a ratio of a pressure of the air through the turbomachine 16 at an outlet of the compressor section (i.e., the compressor exit 102 of the HP compressor 24 for the embodiment shown) to a pressure of the air through the turbomachine 16 at an inlet of the compressor section (i.e., an inlet 106 of the LP compressor 22 for the embodiment shown). In at least certain exemplary embodiments, the overall pressure ratio of the gas turbine engine 101 depicted in FIG. 2 may be at least about 25. For example, in certain exemplary embodiments, the overall pressure ratio of the gas turbine engine 101 depicted in FIG. 2 may be at least about 28, such as at least about 30, such as at least about 32, such as up to about 75. Given the relatively high overall pressure ratio of the exemplary gas turbine engine 101 depicted, it will be appreciated that a temperature of the airflow through the exhaust section 32 of the gas turbine engine 101 may be less than a temperature of the airflow through the downstream end of the compressor section, such as the downstream end of the HP compressor 24, such as the compressor exit 102 of the HP compressor 24.

In exemplary embodiments, in order to allow the exemplary waste heat recovery system 86 depicted in FIG. 2 to transfer heat from the heat source/-heat source exchanger 94 to the heat sink/-heat sink exchanger 96, the exemplary waste heat recovery system 86 further includes the pump 100 in fluid communication with the thermal transfer bus 98 downstream of the heat source exchanger 94 and upstream of the heat sink exchanger 96 for increasing a temperature and a pressure of the thermal transfer fluid in the thermal transfer bus 98. For example, in certain exemplary embodiments, the pump 100 may be configured to provide at least about a twenty-five pounds per square inch ("psi") pressurize rise, such as at least about a fifty psi of pressurize rise, such as at least about a one hundred psi of pressurize rise, such as up to about five thousand psi pressure rise, in the thermal transfer fluid through the thermal transfer bus 98, and similarly may be configured to provide at least about one hundred and fifty (150) degrees Celsius temperature rise, such as at least about two hundred and fifty (250) degrees Celsius temperature rise, and up to about one thousand (1,000) degrees Celsius temperature rise, in the thermal transfer fluid through the thermal transfer bus 98. The pump 100 may be powered through, e.g., one or more of the shafts or spools of the gas turbine engine 101, or alternatively may be powered by an electric motor, hydraulic motor, pneumatic motor, or any other suitable power source. It will be appreciated, however, that in other exemplary embodiments, the pump 100 may have any other suitable configuration. For example, in other embodiments, the pump 100 may be configured to create any other suitable temperature and/or pressure rise, or some other suitable device or configuration may be provided to increase a temperature and/or pressure of the thermal fluid through the thermal transfer bus 98 and provide for the flow of thermal fluid through the thermal transfer bus 98. It is also contemplated that a waste heat recovery system of the present disclosure may include other fluid motive devices, gas motive devices, or other similar flow components that could be used instead of a pump, for example, compressors, etc.

Referring to FIG. 2, it will be appreciated that the exemplary thermal transfer bus 98 is a closed loop thermal transfer bus 98 further extending from the heat sink exchanger 96 back to the heat source exchanger 94. Further, for the embodiment shown, the exemplary waste heat recovery system 86 further includes an expansion device in fluid communication with the thermal transfer bus 98 downstream of the heat sink exchanger 96 and upstream of the heat source exchanger 94. The expansion device may be any suitable expansion device. For example, for the embodiment shown, the expansion device is configured as a turbine 114 in fluid communication with the thermal transfer bus 98 downstream of the heat sink exchanger 96 and upstream of the heat source exchanger 94. With such an embodiment, the turbine 114 may extract additional energy from the thermal transfer fluid, increasing an efficiency of the waste heat recovery system 86 and gas turbine engine 101. As will be appreciated, inclusion of the expansion device may generally allow for the reduction of a temperature of the thermal transfer fluid to a relatively low temperature such that the thermal transfer fluid may accept heat from the heat source through the heat source exchanger 94. For example, the expansion device may reduce a temperature of the thermal transfer fluid at least about one hundred degrees Celsius, such as at least about one hundred and fifty degrees Celsius, such as up to about 1,000 degrees Celsius.

However, in other embodiments, the expansion device may not be configured to extract additional work from the thermal transfer fluid, and instead may simply be configured to expand the thermal transfer fluid (e.g., through an increasing cross-sectional area) to reduce a temperature and pressure of the thermal transfer fluid. Further, although the expansion device/-turbine 114 is depicted schematically inward of the core air flowpath 37 along a radial direction R of the gas turbine engine 101 of FIG. 2, in other embodiments, the expansion device/-turbine 114 may instead be positioned outward of the core air flowpath 37 along the radial direction R and within a core cowling 180 of the turbomachine 16, or elsewhere.

In one or more these embodiments, the thermal transfer fluid may be a single phase thermal transfer fluid during operation of the waste heat recovery system 86. In such a manner, the thermal transfer fluid may remain in substantially a liquid phase during operation. Alternatively, the thermal transfer fluid may be a phase change thermal transfer fluid during operation of the waste heat recovery system 86. For example, the waste heat recovery system 86 may generally operate on a refrigeration cycle, such that the thermal transfer fluid changes between liquid and gaseous phases during operation of the waste heat recovery system 86, or as part of a power generation cycle, where waste heat recovery adds thermal energy to a power generation system, is expanded to produce turb power and then cooled by a turbomachine heat exchanger, and then is pumped through the cycle again (such cycles may also reverse the cooling and expansion process depending on temperatures). The thermal transfer fluid may also be fuel. Additionally, or alternatively still, in one or more these configurations, the thermal transfer fluid may be in a supercritical phase during one or more stages of operation, or during all operations. For example, the thermal transfer fluid may be a supercritical $CO_2$ during certain operations or all operations of the waste heat recovery system 86.

It will be appreciated, however, that the exemplary gas turbine engine 101 and waste heat recovery system 86 depicted in FIG. 2 is provided by way of example only. In other embodiments, the waste heat recovery system 86 may have any other suitable configuration. For example, referring now to FIG. 3, a gas turbine engine 103 including a waste heat recovery system 86 in accordance with another exemplary embodiment of the present disclosure is depicted. The exemplary gas turbine engine 103 and waste heat recovery system 86 of FIG. 3 may be configured in substantially the same manner as exemplary gas turbine engine 101 and waste heat recovery system 86 of FIG. 2.

Figure 3:
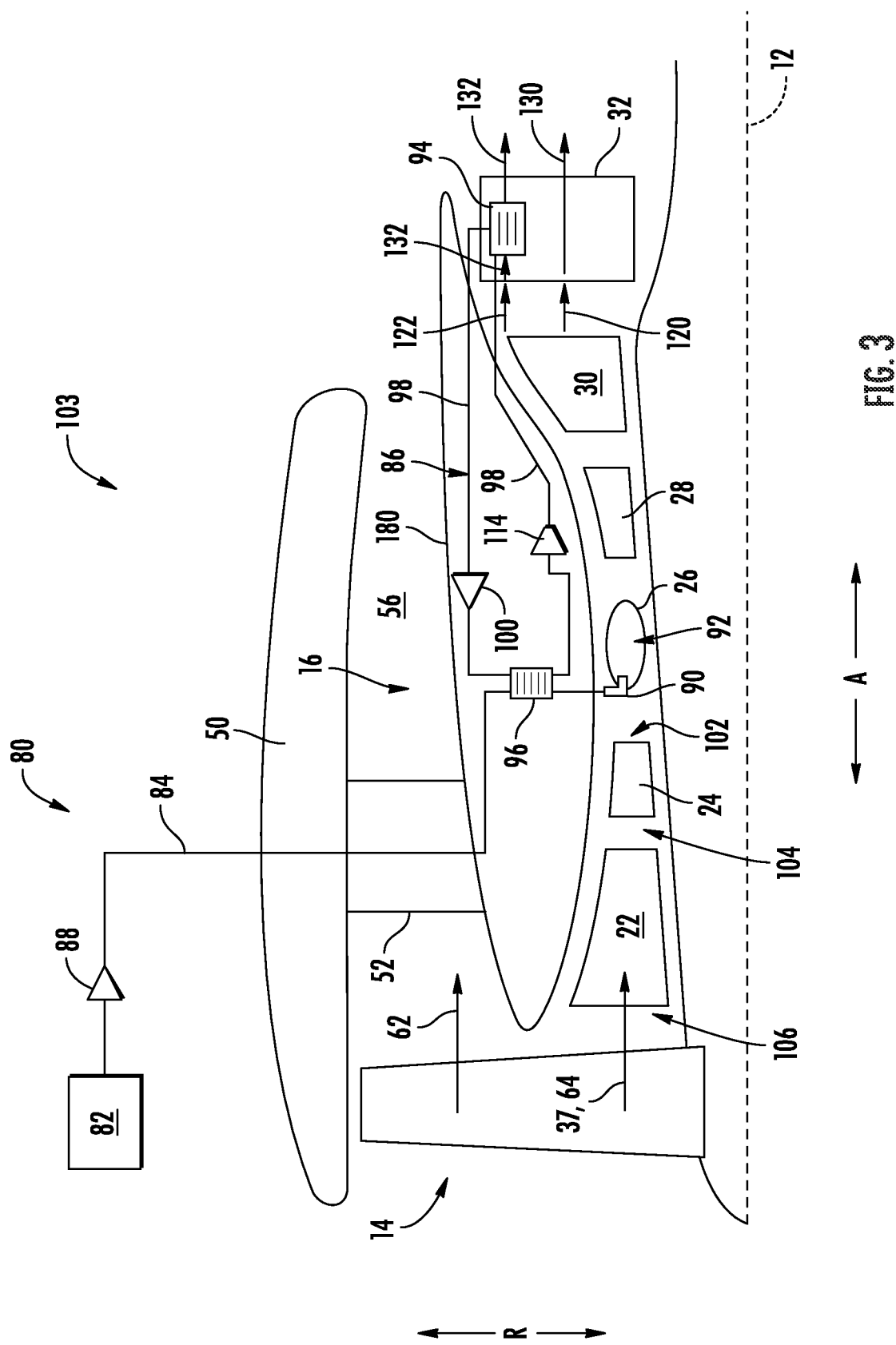
FIG. 3 is a simplified schematic view of a gas turbine engine and a waste heat recovery system in accordance with another exemplary embodiment of the present disclosure.

For example, the exemplary waste heat recovery system 86 of FIG. 3 includes a primary exhaust flowpath 120 and a waste heat recovery flowpath 122 that is parallel to the primary exhaust flowpath 120. Additionally, the waste heat recovery system 86 also includes a heat source exchanger 94, a heat sink exchanger 96, a thermal transfer bus 98 extending from the heat source exchanger 94 to the heat sink exchanger 96, and a pump 100 in fluid communication with the thermal transfer bus 98.

For the embodiment shown, the heat source exchanger 94 is in thermal communication with the heat source, which may generally be the turbine section, e.g., which may include the HP turbine 28 and the LP turbine 30, and the exhaust section 32, or both. For example, for the embodiment of FIG. 3, the heat source includes an airflow exiting the turbine section, e.g., which may include the HP turbine 28 and the LP turbine 30. A first portion of an airflow 130 that exits the turbine section, e.g., which may include the HP turbine 28 and the LP turbine 30, travels through the primary exhaust flowpath 120 and a second portion of an airflow 132 that exits the turbine section, e.g., which may include the HP turbine 28 and the LP turbine 30, is directed to the waste heat recovery flowpath 122. As shown in FIG. 3, the heat source exchanger 94 is disposed within and in thermal communication with the waste heat recovery flowpath 122. For example, the heat source exchanger 94 may be integrated into a portion of the waste heat recovery flowpath 122 or alternatively may be positioned at any other suitable location in thermal communication with an airflow directed through the waste heat recovery flowpath 122. However, for the exemplary embodiment of FIG. 3, the heat sink exchanger 96 is in thermal communication with a fuel delivery system 80 of the gas turbine engine 103. As used herein, a heat source exchanger 94 being in thermal communication with a heat source is understood to include all heat transfer modes, for example, heat through convection, thermal conduction, and thermal radiation from engine sections to the waste heat recovery system 86.

Notably, it will be appreciated that in certain exemplary embodiments, the fuel delivery system 80 may additionally be utilized as a heat sink for other systems of the gas turbine engine 103. As such, the fuel flow through the fuel delivery system 80 (or other component of the fuel delivery system 80 being utilized as the heat sink) may already be at a relatively high temperature prior to interacting with the heat sink exchanger 96 of the waste heat recovery system 86. In such a manner, it will be appreciated that, in at least certain exemplary aspects, the fuel delivery system 80 may define a reference point at which the heat sink exchanger 96 is thermally coupled to the fuel delivery system 80, and may further define a sink reference temperature at, or immediately upstream of, the reference point. The reference point may be within a fuel line 84 of the fuel delivery system 80, on a fuel nozzle 90 of the fuel delivery system 80, etc. Similarly, the turbine section, e.g., which may include the HP turbine 28 and the LP turbine 30, may define a source reference temperature at a location at, or immediately upstream of where the heat source exchanger 94 is thermally coupled to the turbine section and the exhaust section 32 (a location within the LP turbine 30 for the embodiment depicted). The relationship of a source reference temperature and sink reference temperature for the embodiment of FIG. 3 may be similar to the relationship between a source reference temperature and sink reference temperature for the embodiment described above with reference to FIG. 2. However, as with the embodiment described above, given the inclusion of the pump 100 in the thermal transfer bus 98, the waste heat recovery system 86 may still be capable of extracting heat from the turbine section and exhaust section 32 and transferring such heat to a higher temperature location where such heat may be utilized more efficiently.

It will further be appreciated that in still other exemplary embodiments, other suitable configurations may be provided.

Figure 4:
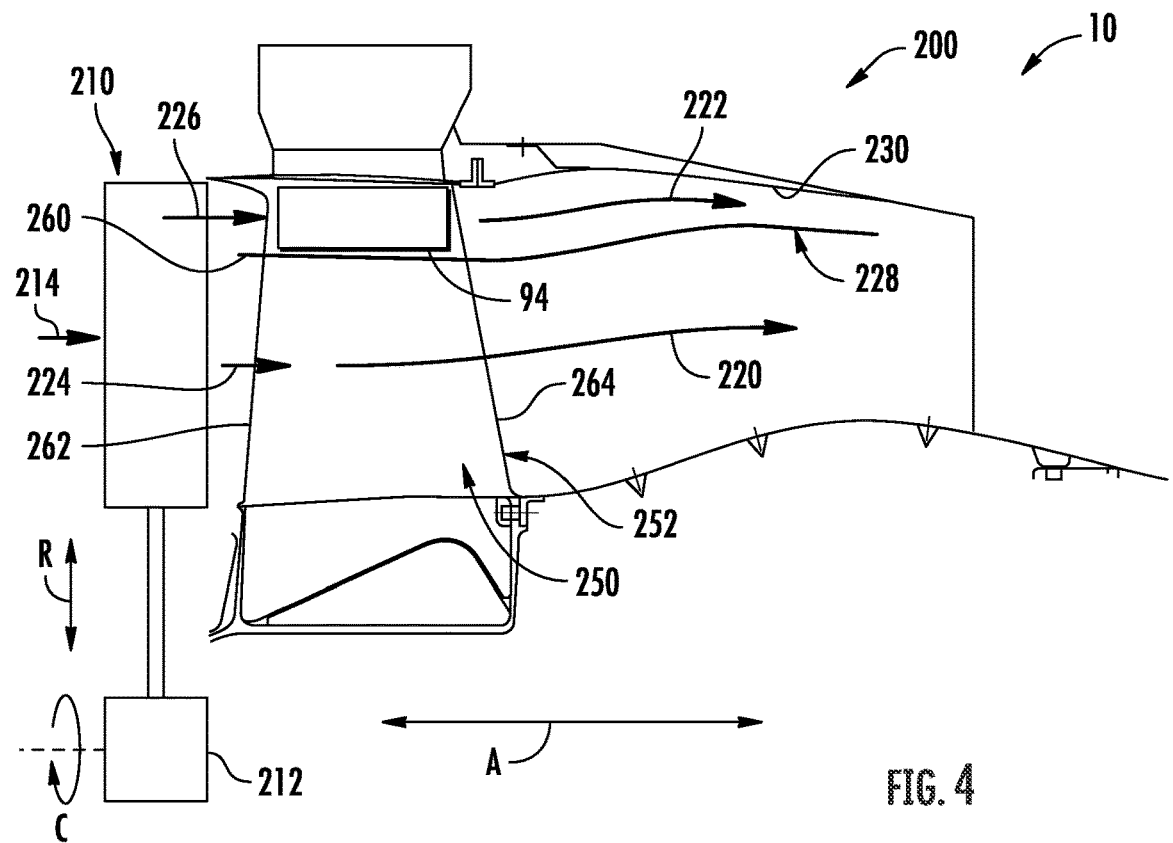
FIG. 4 is a simplified schematic view of a gas turbine engine and a waste heat recovery system in accordance with an exemplary embodiment of the present disclosure.
Figure 5:
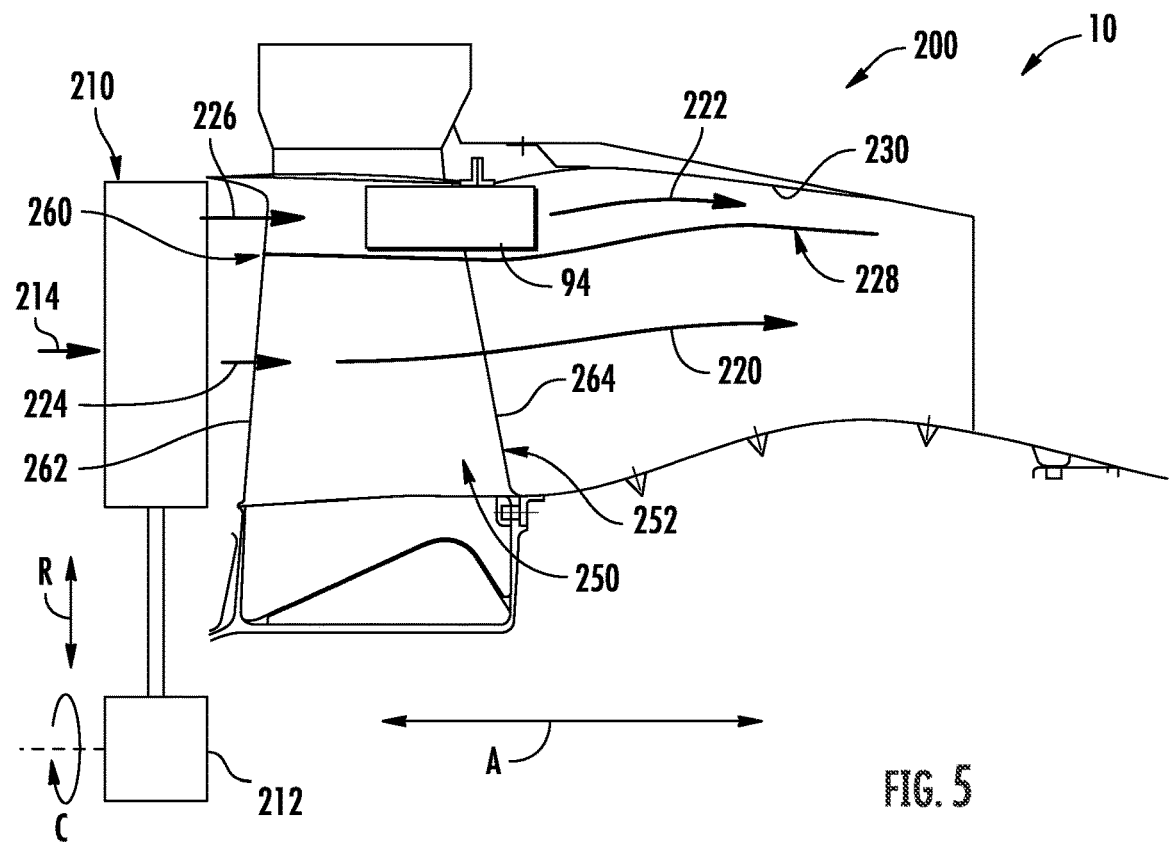
FIG. 5 is a simplified schematic view of a gas turbine engine and a waste heat recovery system in accordance with another exemplary embodiment of the present disclosure.
Figure 6:
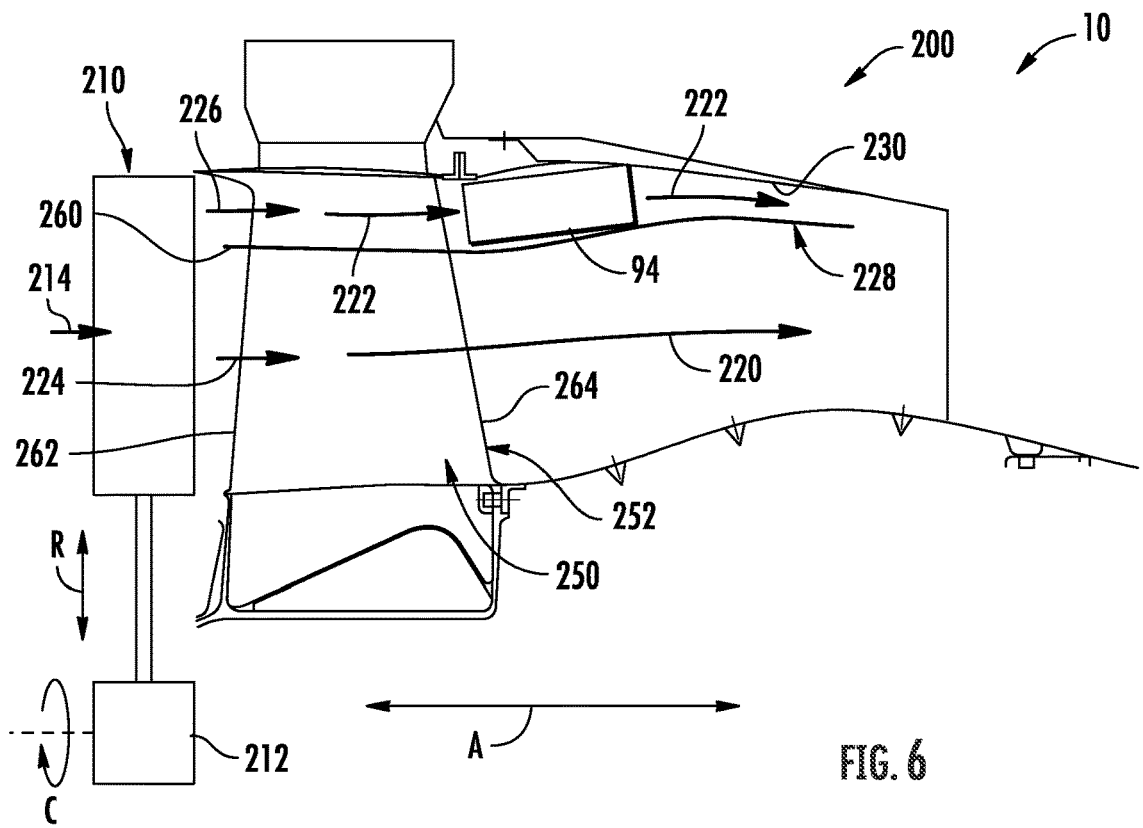
FIG. 6 is a simplified schematic view of a gas turbine engine and a waste heat recovery system in accordance with another exemplary embodiment of the present disclosure.

Referring now generally to FIGS. 4 through 6, simplified schematic views of gas turbine engines 10 and waste heat recovery systems 200 in accordance with various exemplary embodiments of the present disclosure are provided. The exemplary gas turbine engines 10 and waste heat recover systems 200 of FIGS. 4 through 6 may be configured in a similar manner as the exemplary gas turbine engines 10 and waste heat recover systems 86 described above with respect to FIGS. 1 through 3.

For example, in the exemplary embodiments depicted in FIGS. 4 through 6, the exemplary waste heat recovery systems 200 include a primary exhaust flowpath 220 and a waste heat recovery flowpath 222. As shown in FIGS. 4 through 6, the waste heat recovery flowpaths 222 are outward of the primary exhaust flowpaths 220, each in a radial direction R of the respective gas turbine engine. In exemplary embodiments, the primary exhaust flowpath 220 and the waste heat recovery flowpath 222 are located aft of the LP turbine 30 (FIG. 1) extending into the exhaust section 32 (FIG. 1) of the respective gas turbine engine, which may be configured in a similar manner to the exemplary turbofan engines 10 of FIGS. 1 through 3.

In exemplary embodiments, referring still to FIGS. 4 through 6, the heat source exchanger 94 (i.e., a heat exchanger configured to extract heat for the waste heat recovery system 200 from a heat source of the gas turbine engine 10) is disposed within and in thermal communication with the respective waste heat recovery flowpath 222.

Referring specifically to FIG. 4, the heat source includes an airflow exiting a turbine section 210. In exemplary embodiments, it is contemplated that the turbine section 210 will include a last rotating stage 212 (e.g., of the LP turbine 30) and the waste heat recovery system 200 will be aft of/-downstream of the last rotating stage 212 of the turbine section 210. A core airflow 214 passing through the turbine section 210 exits the turbine section 210 where a first portion of the core airflow 214 that exits the turbine section 210 travels through the primary exhaust flowpath 220 as a primary exhaust airflow 224 and a second portion of the core airflow that exits the turbine section 210 is directed to the waste heat recovery flowpath 222 as a waste heat recovery airflow 226. As shown in FIG. 4, the heat source exchanger 94 is disposed within and in thermal communication with the waste heat recovery flowpath 222. For example, the heat source exchanger 94 may be integrated into a portion of the waste heat recovery flowpath 222 or alternatively may be positioned at any other suitable location in thermal communication with an airflow directed through the waste heat recovery flowpath 222.

For the embodiments depicted in FIGS. 4-6, the waste heat recovery system 200 includes a divider 228 disposed between and separating the primary exhaust flowpath 220 from the waste heat recovery flowpath 222. In some embodiments, divider 228 is a wall or other type of structural component for creating diverging airflows from an incoming airflow. An outer wall 230 is disposed outward from the divider 228 in the radial direction R. In an exemplary embodiment, the divider 228 and the outer wall 230 extend generally along axial direction A. The waste heat recovery flowpath 222 is defined between the outer wall 230 and the divider 228.

In the illustrated embodiments, the gas turbine engine 10 includes a turbine rear frame 250. The turbine rear frame 250 is a rotor support assembly for the LP turbine 30 (FIG. 1) that is a stationary annular structure having circumferentially-spaced vanes 252. The turbine rear frame 250 extends through the core air flowpath at a location downstream of the turbine section, and the vanes 252 define forward or leading edges 262 of the turbine rear frame 250 within the core air flowpath 37 (FIG. 1).

In FIGS. 4 and 6, a forward or leading edge 260 of the divider 228 is located at an axial position upstream of an axial location of the leading edge 262 of the vanes 252. In some embodiments (e.g., as depicted in FIG. 5), the leading edge 260 of the divider 228 is located at an axial position at or corresponding to an axial location of the leading edge 262 of the vanes 252. As used herein, locating the leading edge 260 of the divider 228 at an axial position corresponding to the leading edge 262 of the vanes 252 shall mean locating the leading edge 260 of the divider 228 at the leading edge 262 of the vanes 252 or aft of the leading edge 262 of the vanes 252 within a distance from the leading edge 262 of the vanes 252 of twenty-five percent (25%) of an axial chord extending from the leading edge 262 to the trailing edge 264 of the vane 252. Thus, at least a portion of the divider 228 is axially located corresponding to the leading edge 260 of the vane 252. Accordingly, in each of the embodiments depicted in FIGS. 4-6, the core airflow 214 exiting the turbine section 210 (e.g., exiting the last stage of the LP turbine 30 (FIG. 1)) is separated by the divider 228 into the primary exhaust airflow 224 and the waste heat recovery airflow 226 before the core airflow 214 passes downstream of the leading edge 262 of the vanes 252. In other words, the primary exhaust flowpath 220 and the waste heat recovery flowpath 222 are formed at or forward of the leading edges 262 of the vanes 252 by the divider 228 such that the core airflow 214 is separated into the primary exhaust airflow 224 and the waste heat recovery airflow 226 before passing downstream of the leading edges 262 of the vanes 252. It should be appreciated that in the embodiments described in connection with FIG. 4-6, the leading edge 260 of the divider 228 maybe axially located forward of the leading edge 262 of the vane 252 or at an axial location corresponding to or the same as the axial location of the leading edge 262 of the vane 252 such that the primary exhaust flowpath 220 and the waste heat recovery flowpath 222 are formed at or forward of the leading edges 262 of the vanes 252. In exemplary embodiments, the heat source exchanger 94 may be coupled to one or both of the divider 228 and outer wall 230, may be part of the turbine rear frame 252, or may be coupled to the turbine rear frame.

In the embodiment depicted in FIG. 4, the heat source exchanger 94 is axially located between the leading edges 262 of the vanes 252 and trailing or aft edges 264 of the vanes 252. For example, in the illustrated embodiment, waste heat recovery system 200 includes a plurality of heat source exchangers 94 such that each heat source exchanger 94 is located between a pair of spaced-apart vanes 252. In FIG. 5, the heat source exchanger 94 is located aft of the location depicted in FIG. 4 such that a portion of the heat source exchanger 94 is axially located between the leading edges 262 of the vanes 252 and trailing or aft edges 264 of the vanes 252 while a remaining portion of the heat source exchanger 94 is axially located aft of the aft edges 264 of the vanes 252. In FIG. 5, at least a portion of the heat source exchanger 94 remains positioned between spaced-apart vanes 252. In FIG. 6, the heat source exchanger 94 is located aft of the locations depicted in FIGS. 4 and 5 such that the heat source exchanger 94 is located aft of the aft edges 264 of the vanes 252. It should be appreciated that a location of the heat source exchanger 94 may vary in the axial direction A while being positioned to receive the waste heat recovery airflow 226.

In operation, the waste heat recovery flowpath 222 is created at a location corresponding to or forward of the vanes 252 and radially outward in the core air flowpath 37 (FIG. 1) such that the waste heat recovery flowpath 222 captures portions of the core airflow 214 that leak over the tips or radially outward ends of the turbine blades of the last rotating stage 212 of the turbine section 210. Thus, that portion of the core airflow 214 that leaks over the tips of the last rotating stage 212 of the turbine section 210 is at a higher temperature and pressure than portions of the core airflow 214 that did not leak over the tips of the last rotating stage 212 of the turbine section 210. The waste heat recovery flowpath 222 is radially and axially located to capture that leaking portion of the core airflow 214, thereby enabling more efficient use of that portion of the core airflow 214 via the heat source exchanger 94.

Figure 7:
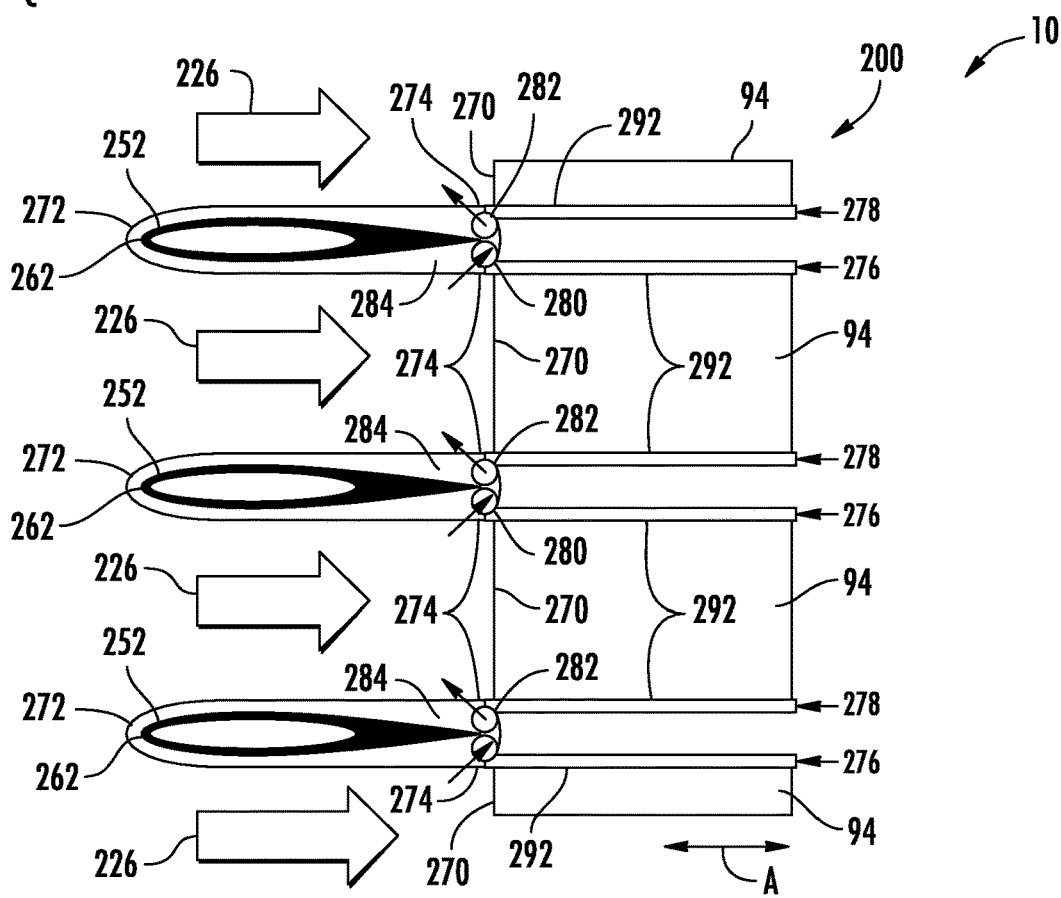
FIG. 7 is a simplified schematic view of a gas turbine engine and a waste heat recovery system in accordance with an exemplary embodiment of the present disclosure.

Referring to FIG. 7, FIG. 7 illustrates a simplified schematic view of the gas turbine engine 10 and the waste heat recovery system 200 in accordance with an exemplary embodiment of the present disclosure from a radially inward perspective. In the illustrated embodiment, spaced-apart vanes 252 are depicted with heat source exchangers 94 located to receive the waste heat recovery airflow 226 flowing past the vanes 252. In FIG. 7, the inlets 270 of the heat source exchangers 94 are positioned axially corresponding to the aft edges 264 of the vanes 252. In the illustrated embodiment, a fairing 272 is associated with each vane 252. In this embodiment, the fairings 272 extend or wrap around the leading edges 262 of the vanes 252 and extend in an aft direction (or a downstream direction (in FIG. 7, left-to-right)) to the inlets 270 of the heat source exchangers 94. The fairings 272 may be coupled to the vanes 252 or other supporting structure.

As depicted in FIG. 7, the fairings 272 provide a smooth airflow path for the waste heat recovery airflow 226 flowing past the vanes 252 to the heat source exchangers 94. Sidewalls 292 of the heat source exchangers 94 may be integrated with aft edges 274 of the fairings 272 to maintain a smooth transition of the waste heat recovery airflow 226 entering the heat source exchangers 94 (e.g., rabbet joint techniques or other joining methods). As depicted in FIG. 7, each heat source exchanger 94 includes an inlet manifold 276 and an outlet manifold 278 for distributing the internal flow stream of fluids through or within the heat source exchangers 94. In FIG. 7, an input thermal transfer bus 280 delivers a thermal transfer fluid to the inlet manifold 276, and an output thermal transfer bus 282 transfers the thermal transfer fluid from the outlet manifold 278 to the heat sink exchanger 96 (FIGS. 2 and 3). In the illustrated embodiment, the input thermal transfer bus 280 and the output thermal transfer bus 282 are coupled to the heat source exchangers 94 to minimize disruption or turbulence in the waste heat recovery airflow 226. For example, in the illustrated embodiment, the input thermal transfer bus 280 and the output thermal transfer bus 282 are coupled to the heat source exchangers 94 at locations between the fairings 272 and the vanes 252 near the aft edges 264 of the vanes 252 (e.g., within an interior area 284 of the fairings 272) such that the input thermal transfer bus 280 and the output thermal transfer bus 282 remain out of the waste heat recovery airflow 226.

Figure 8:
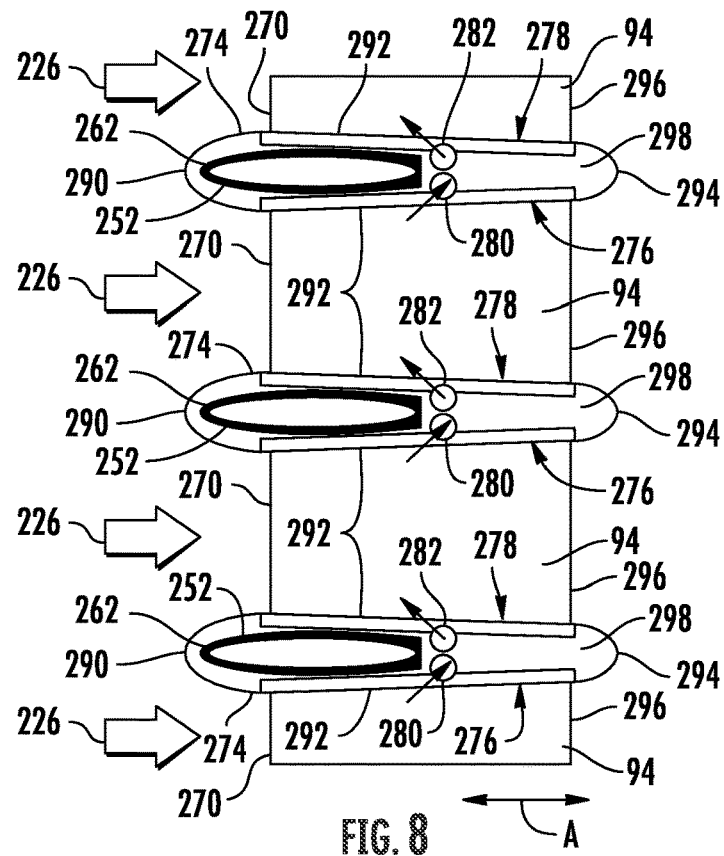
FIG. 8 is a simplified schematic view of a gas turbine engine and a waste heat recovery system in accordance with another exemplary embodiment of the present disclosure.

Referring to FIG. 8, FIG. 8 illustrates a simplified schematic view of the gas turbine engine 10 and the waste heat recovery system 200 in accordance with another exemplary embodiment of the present disclosure from a radially inward perspective. In the illustrated embodiment, spaced-apart vanes 252 are depicted with heat source exchangers 94 located to receive the waste heat recovery airflow 226 flowing past the vanes 252. In FIG. 8, the heat source exchangers 94 are positioned axially such that the inlets 270 are located between the leading edges 262 of the vanes 252 and the aft edges 264 of the vanes 252.

In the illustrated embodiment, a forward fairing 290 is associated with the leading edge 262 of each vane 252 that extends or wraps around the leading edge 262 of the vane 252. The forward fairings 290 extend in an aft direction (or a downstream direction (in FIG. 8, left-to-right)) to the inlets 270 of the heat source exchangers 94 and are integrated with the heat source exchangers 94 to provide a smooth airflow path for the waste heat recovery airflow 226. For example, the forward fairings 290 may be integrated with sidewalls 292 of the heat source exchangers (e.g., using rabbet joints or other types of attachment techniques) to provide a smooth airflow surface for the waste heat recovery airflow 226.

In FIG. 8, aft fairings 294 are associated with outlets 296 of the heat source exchanger 94 (e.g., the waste heat recovery airflow 226 exiting downstream from the heat source exchanger 94). For example, in the illustrated embodiment, aft fairings 294 integrate with the sidewalls 292 of respective heat source exchanger 94 proximate the outlets 296 of the heat source exchanger 94. For example, in FIG. 8, each aft fairing closes an otherwise open void area 298 between the heat source exchanger 94 and facilitates reduced turbulence from the mixing of the waste heat recovery airflows exiting the respective heat source exchanger 94. In FIG. 8, each aft fairing extends from a sidewall 292 of one heat source exchanger 94 to a sidewall 292 of an adjacent heat source exchanger 94. Similar to forward fairings 290, aft fairings 294 may be integrated with the sidewalls 292 of the heat source exchanger 94 using rabbet joint techniques or other type of attachment methods.

Similar to the embodiment illustrated in FIG. 7, each heat source exchanger 94 includes the inlet manifold 276 and the outlet manifold 278 for distributing the internal flow stream of fluids through or within the heat source exchangers 94. In FIG. 8, the input thermal transfer bus 280 delivers a thermal transfer fluid to the inlet manifold 276, and the output thermal transfer bus 282 transfers the thermal transfer fluid from the outlet manifold 278 to the heat sink exchanger 96 (FIGS. 2 and 3). In the illustrated embodiment, the input thermal transfer bus 280 and the output thermal transfer bus 282 are coupled to the heat source exchangers 94 to minimize disruption or turbulence in the waste heat recovery airflow 226. For example, in the illustrated embodiment, the input thermal transfer bus 280 and the output thermal transfer bus 282 are coupled to the heat source exchangers 94 at locations between adjacent heat source exchangers 94 aft of the vanes 252 such that the input thermal transfer bus 280 and the output thermal transfer bus 282 remain out of the waste heat recovery airflow 226.

Figure 9:
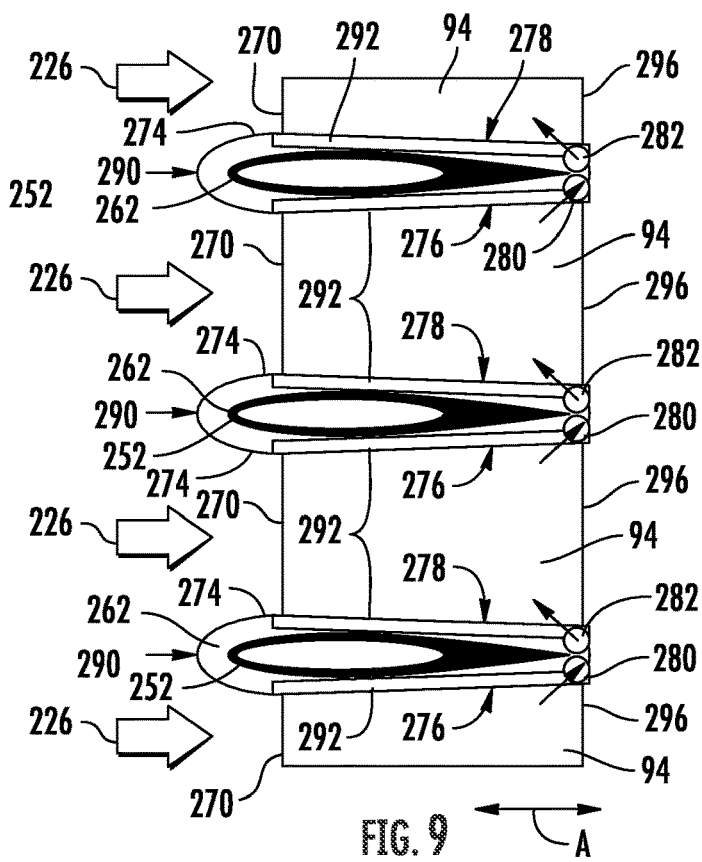
FIG. 9 is a simplified schematic view of a gas turbine engine and a waste heat recovery system in accordance with another exemplary embodiment of the present disclosure.

Referring to FIG. 9, FIG. 9 illustrates a simplified schematic view of the gas turbine engine 10 and the waste heat recovery system 200 in accordance with another exemplary embodiment of the present disclosure from a radially inward perspective. In the illustrated embodiment, spaced-apart vanes 252 are depicted with heat source exchangers 94 located to receive the waste heat recovery airflow 226 flowing past the vanes 252. In FIG. 9, the heat source exchangers 94 are positioned axially such that the inlets 270 are located aft of the leading edges 262 of the vanes 252 and the outlets 296 of the heat source exchangers 94 are axially located corresponding to the aft edges 264 of the vanes 252.

In the illustrated embodiment, a forward fairing 290 is associated with the leading edge 262 of each vane 252 that extends or wraps around the leading edge 262 of the vane 252. The forward fairings 290 extend in an aft direction (or a downstream direction (in FIG. 9, left-to-right)) to the inlets 270 of the heat source exchangers 94 and are integrated with the heat source exchangers 94 to provide a smooth airflow path for the waste heat recovery airflow 226. For example, the forward fairings 290 may be integrated with the sidewalls 292 of the heat source exchangers (e.g., using rabbet joints or other types of attachment techniques) to provide a smooth airflow surface for the waste heat recovery airflow 226.

Similar to the embodiment illustrated in FIGS. 7 and 8, each heat source exchanger 94 includes the inlet manifold 276 and the outlet manifold 278 for distributing the internal flow stream of fluids through or within the heat source exchangers 94. In FIG. 9, the input thermal transfer bus 280 delivers a thermal transfer fluid to the inlet manifold 276, and the output thermal transfer bus 282 transfers the thermal transfer fluid from the outlet manifold 278 to the heat sink exchanger 96 (FIGS. 2 and 3). In the illustrated embodiment, the input thermal transfer bus 280 and the output thermal transfer bus 282 are coupled to the heat source exchangers 94 to minimize disruption or turbulence in the waste heat recovery airflow 226. For example, in the illustrated embodiment, the input thermal transfer bus 280 and the output thermal transfer bus 282 are coupled to the heat source exchangers 94 at locations aft of the vanes 252 and between adjacent heat source exchangers 94 such that the input thermal transfer bus 280 and the output thermal transfer bus 282 remain out of the waste heat recovery airflow 226.

According to exemplary embodiments of the present disclosure, integrating the heat source exchanger 94 completely or partially with the turbine rear frame 250 (e.g., as depicted and described in connection with at least FIGS. 4-9) limits the ingestion of turbine rear frame 250 wakes into the heat source exchanger 94, thereby increasing performance characteristics of the heat source exchanger 94. Additionally, integrating the heat source exchanger 94 completely or partially with the turbine rear frame 250 limits structural impact to the turbine rear frame 250 and reduces the weight of the engine 10. In FIGS. 7-9, the heat source exchanger 94 is depicted as being integrated with fairings to maintain an aerodynamic airflow surface. However, it should be understood that the heat source exchanger 94 may also be integrated with the vanes 252 (e.g., made part of the vanes 252 or coupled to the vanes 252) to maintain an aerodynamic airflow surface for the waste heat recovery airflow 226.

Figure 10:
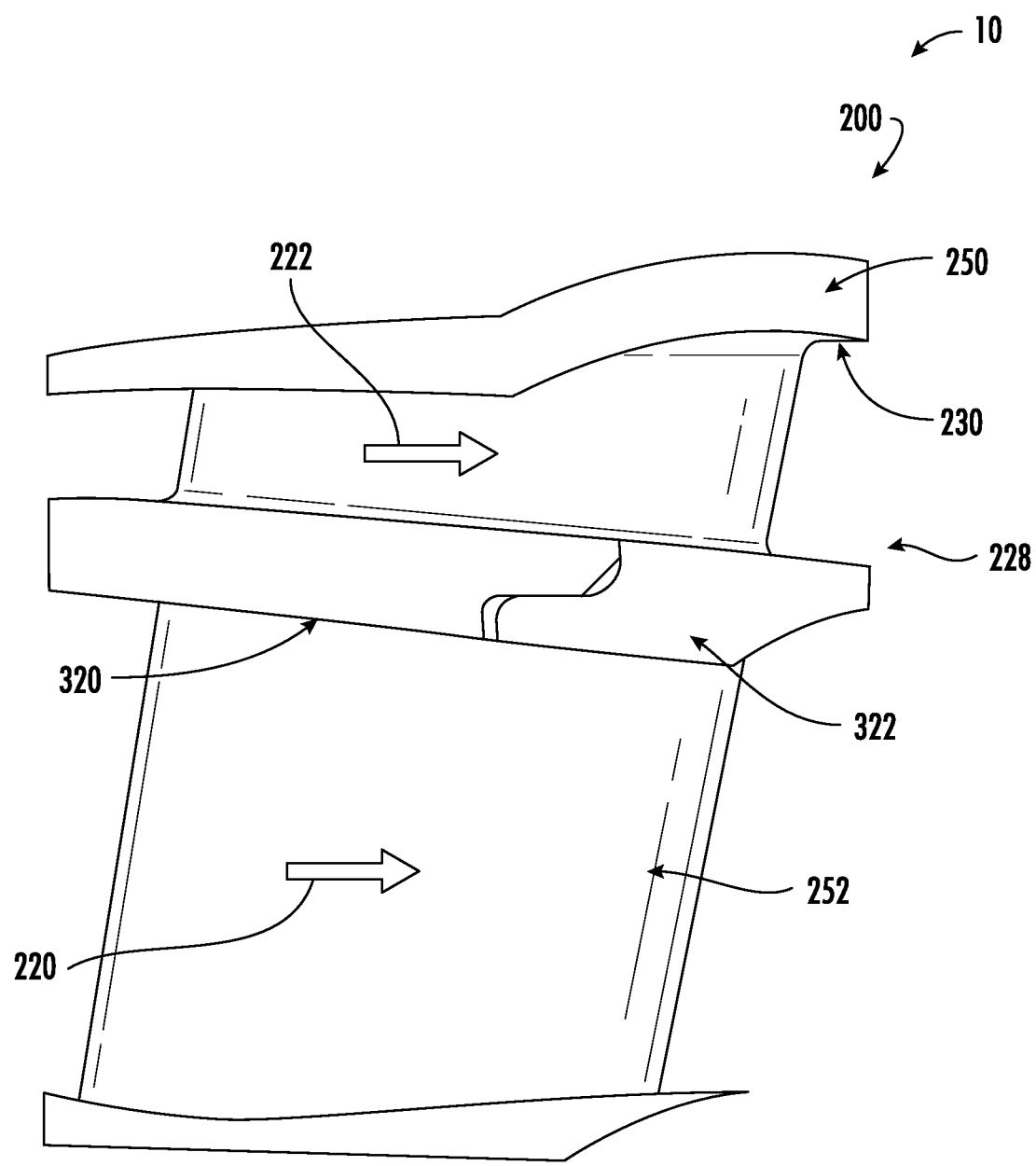
FIG. 10 is an isometric view of a portion of a gas turbine engine and a waste heat recovery system in accordance with an exemplary embodiment of the present disclosure.

Referring to FIG. 10, FIG. 10 illustrates an isometric view of a portion of a gas turbine engine 10 and a waste heat recovery system 200 in accordance with an exemplary embodiment of the present disclosure. In FIG. 10, an exemplary embodiment of an attachment mechanism for creating the primary exhaust flowpath 220 and the waste heat recovery flowpath 222 via the divider 228 is depicted. For example, in the illustrated embodiment, a first portion 320 of the divider 228 may be integrated with the vane 252. A second portion 322 of the divider 228 is integrated with the first portion 320 and extends rearward and downstream of the turbine rear frame 250. The first portion 320 and second portion 322 of the divider 228 may be coupled together using a rabbet joint mechanism or other type of attachment method to maintain aerodynamic surfaces for a smooth airflow.

Figure 11:
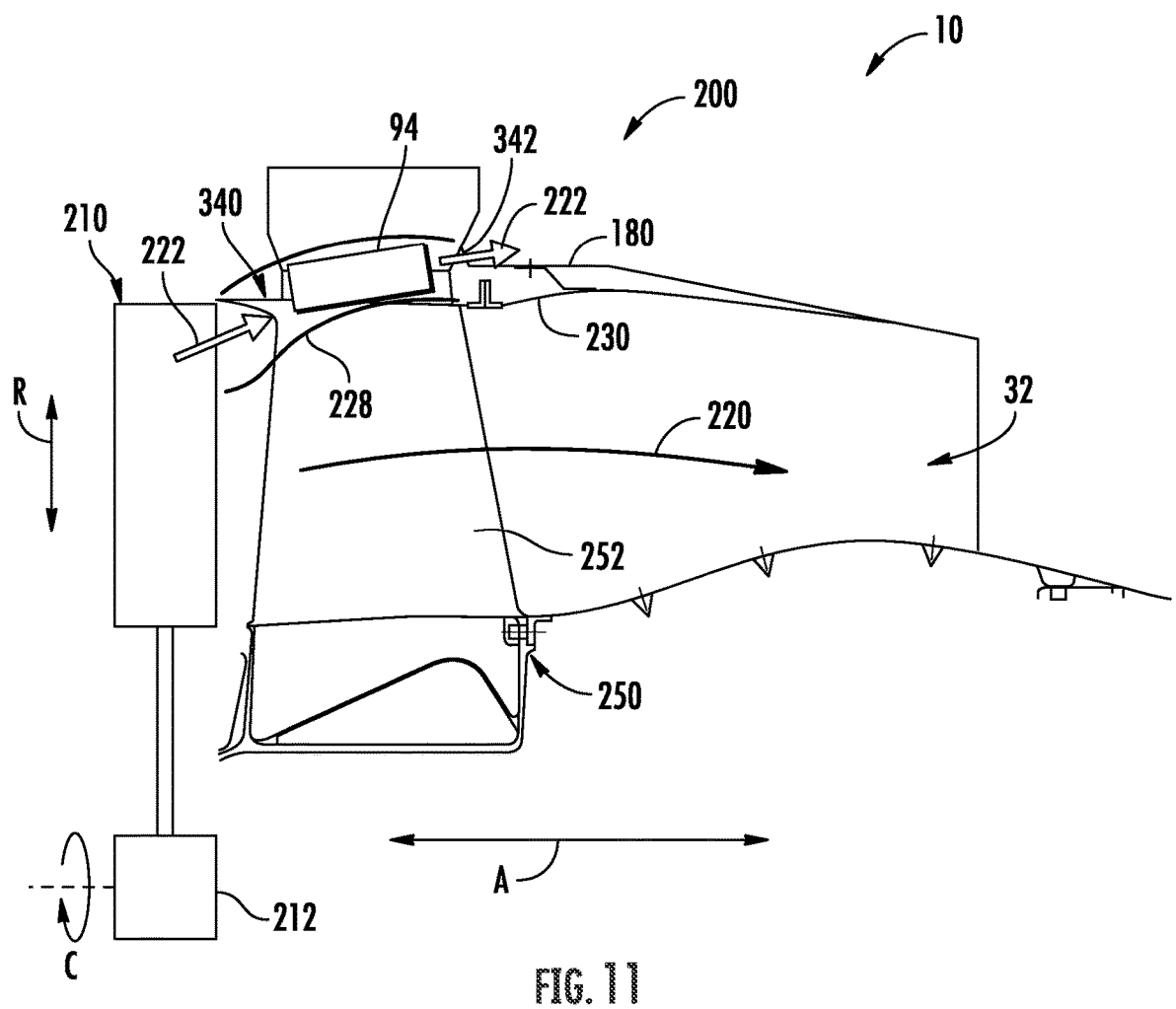
FIG. 11 is a simplified schematic side view of the gas turbine engine and waste heat recovery system in accordance with another exemplary embodiment of the present disclosure.

FIG. 11 is a simplified schematic side view of the gas turbine engine 10 and waste heat recovery system 200 in accordance with another exemplary embodiment of the present disclosure. The exemplary gas turbine engine 10 and waste heat recover systems 200 of FIG. 11 may be configured in a similar manner as the exemplary gas turbine engines 10 and waste heat recover systems 200 described above with respect to FIGS. 4-5 such that the exemplary waste heat recovery system 200 includes a primary exhaust flowpath 220 and a waste heat recovery flowpath 222 created by the divider 228. In the illustrated embodiment, the waste heat recovery flowpath 222 is diverted through a forward portion 340 of the turbine rear frame 250 and led radially outboard of the outer wall 230 of the exhaust section 32. In this embodiment, after exiting the heat source exchanger 94, the waste heat recovery airflow 226 (FIG. 4) is exhausted through an exhaust vent 342 located in the core cowling 180. In other words, the waste heat recovery airflow 226 (FIG. 4) is exhausted into the bypass airflow passage 56 (FIG. 1) instead of mixing with the primary exhaust airflow 224 (FIG. 4) in the exhaust section 32.

Figure 12:
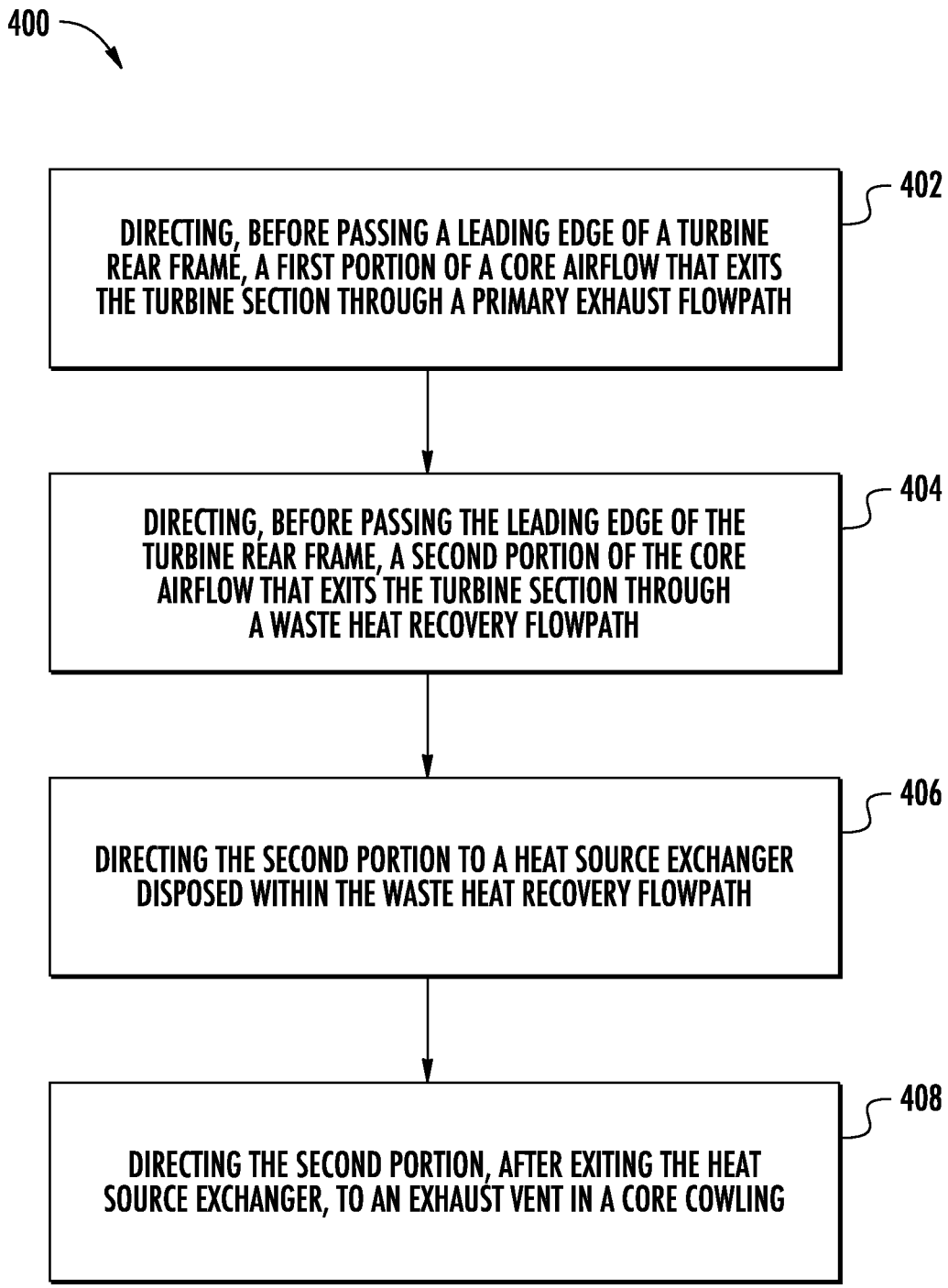
FIG. 12 is a flow diagram of a method for operating a gas turbine engine including a waste heat recovery system in accordance with the present disclosure.

Referring now to FIG. 12, a method 400 for operating a waste heat recovery system 200 for a gas turbine engine 10 having a compressor section, a combustion section, a turbine section, and an exhaust section in serial flow order and together defining a core air flowpath in accordance with an exemplary aspect of the present disclosure is provided. In certain exemplary aspects, the method 400 may be utilized with one or more of the exemplary gas turbine engines described above.

The method 400 includes at (402) directing, before passing a leading edge of a turbine rear frame, a first portion of a core airflow that exits the turbine section through a primary exhaust flowpath as described in detail above with reference to FIGS. 1 through 11.

The method 400 further includes at (404) directing, before passing the leading edge of the turbine rear frame, a second portion of the core airflow that exits the turbine section through a waste heat recovery flowpath as described in detail above with reference to FIGS. 1 through 11.

The method 400 further includes at (406) directing the second portion to a heat source exchanger disposed within the waste heat recovery flowpath as described in detail above with reference to FIGS. 1 through 11.

The method 400 further includes at (408) directing the second portion, after exiting the heat source exchanger, to an exhaust vent in a core cowling as described in detail above with reference to FIGS. 1 through 11.

Inclusion of a waste heat recovery system in accordance with one or more of these embodiments may generally allow for a more efficient gas turbine engine. More specifically, inclusion of a waste heat recovery system in accordance with one or more of these embodiments may generally allow for utilization of "waste heat" (i.e., heat that is not being utilized to provide work for the engine, or not efficiently being utilized to provide work for the engine) to increase an efficiency of the engine. For example, inclusion of a waste heat recovery system in accordance with one or more of these embodiments may allow for utilization of at least a portion of any heat remaining in, for example, an exhaust of the engine to heat an airflow or fuel provided to the combustion chamber prior to such airflow or fuel being combusted. Such may generally result in a greater amount of energy generation through such combustion process, which may allow for the engine to extract an increased amount of work through the combustion process (resulting in a more efficient use of such extracted heat energy, and a more efficient gas turbine engine). Further, the heat recovery flowpath is created at a location at or upstream of a defined leading edge of the turbine rear frame within the core air flowpath and radially outward in the core air flowpath such that the waste heat recovery flowpath captures portions of the core airflow that leak over the tips or radially outward ends of the turbine blades of the last rotating stage of the turbine section, thereby capturing a portion of the core airflow that is at a higher temperature and pressure than portions of the core airflow that did not leak over the tips of the last rotating stage of the turbine section.

Further aspects of the disclosure are provided by the subject matter of the following clauses:

A gas turbine engine comprising: a compressor section, a combustion section, a turbine section, and an exhaust section in serial flow order and together defining a core air flowpath, the core air flowpath having a turbine rear frame extending through the core air flowpath at a location downstream of the turbine section, the turbine rear frame defining a leading edge within the core air flowpath; and a waste heat recovery system operable to separate, at or upstream of the leading edge of the turbine rear frame, a core airflow exiting the turbine section into a primary exhaust airflow and a waste heat recovery airflow, the waste heat recovery system comprising a heat source exchanger positioned to receive the waste heat recovery airflow.

The gas turbine engine of any preceding clause, wherein the waste heat recovery system includes a divider to separate the core airflow into the primary exhaust airflow and the waste heat recovery airflow, at least a portion of the divider positioned at an axial location corresponding to the leading edge of the turbine rear frame.

The gas turbine engine of any preceding clause, wherein the heat source exchanger is coupled to or integrated with the turbine rear frame.

The gas turbine engine of any preceding clause, wherein the turbine rear frame comprises a plurality of circumferentially-spaced vanes, and wherein the heat source exchanger is axially located at least partially between first and second vanes of the plurality of vanes.

The gas turbine engine of any preceding clause, wherein the turbine rear frame comprises a plurality of circumferentially-spaced vanes and a plurality of fairings, and wherein each fairing is coupled to a respective vane.

The gas turbine engine of any preceding clause, wherein the waste heat recovery system includes a divider operable to define a primary exhaust flowpath for the primary exhaust airflow and a waste heat recovery flowpath for the waste heat recovery airflow, and wherein the heat source exchanger is coupled to or integrated with a respective fairing.

The gas turbine engine of any preceding clause, further comprising a core cowling having a vent, wherein the waste heat recovery airflow is exhausted through the vent in the core cowling.

A gas turbine engine comprising: a compressor section, a combustion section, a turbine section, and an exhaust section in serial flow order and together defining a core air flowpath; a turbine rear frame extending through the core air flowpath at a location downstream of the turbine section; a divider operable to define a primary exhaust flowpath and a waste heat recovery flowpath; and a heat source exchanger positioned in thermal communication with the waste heat recovery flowpath and coupled to or integrated with the turbine rear frame.

The gas turbine engine of any preceding clause, wherein at least a portion of the divider is axially located corresponding to a leading edge of the turbine rear frame.

The gas turbine engine of any preceding clause, wherein a leading edge of the divider is axially located forward of a leading edge of the turbine rear frame.

The gas turbine engine of any preceding clause, wherein the turbine rear frame comprises a plurality of circumferentially-spaced vanes, and wherein the heat source exchanger is axially located at least partially between first and second vanes of the plurality of vanes.

The gas turbine engine of any preceding clause, wherein the turbine rear frame comprises a plurality of circumferentially-spaced vanes and a plurality of fairings, and wherein each fairing is coupled to a respective vane.

The gas turbine engine of any preceding clause, wherein the heat source exchanger is coupled to or integrated with respective fairings.

The gas turbine engine of any preceding clause, further comprising a core cowling, wherein the waste heat recovery flowpath comprises an exhaust vent in the core cowling.

The gas turbine engine of any preceding clause, wherein an inlet of the heat source exchanger is axially located forward of an aft edge of the turbine rear frame.

The gas turbine engine of any preceding clause, wherein the turbine rear frame comprises a plurality of circumferentially-spaced vanes, and wherein each vane includes a forward fairing and an aft fairing.

The gas turbine engine of any preceding clause, wherein the heat source exchanger is coupled to the respective vane and integrated with the respective forward fairing and the respective aft fairing.

A method for operating a waste heat recovery system for a gas turbine engine having a compressor section, a combustion section, a turbine section, and an exhaust section in serial flow order and together defining a core air flowpath, the method comprising: directing, before passing a leading edge of a turbine rear frame, a first portion of a core airflow that exits the turbine section through a primary exhaust flowpath; directing, before passing the leading edge of the turbine rear frame, a second portion of the core airflow that exits the turbine section through a waste heat recovery flowpath; and directing the second portion to a heat source exchanger disposed within the waste heat recovery flowpath.

The method of any preceding clause, further comprising directing the second portion, after exiting the heat source exchanger, to an exhaust vent in a core cowling.

The method of any preceding clause, further comprising separating the core airflow into the first and second portions at an axial location forward of the leading edge of the turbine rear frame.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine comprising:
   a compressor section, a combustion section, a turbine section, and an exhaust section in serial flow order and together defining a core air flowpath;
   a turbine rear frame extending through the core air flowpath at a location downstream of the turbine section, the turbine rear frame defining a leading edge within the core air flowpath; and
   a waste heat recovery system operable to separate, at or upstream of the leading edge of the turbine rear frame, a core airflow exiting the turbine section into a primary exhaust airflow and a waste heat recovery airflow, the waste heat recovery system comprising:
      a divider operable to define a primary exhaust flowpath and a waste heat recovery flowpath, wherein at least a portion of the divider is axially located corresponding to a leading edge of the turbine rear frame; and
      a heat source exchanger positioned at least partially in the waste heat recovery flowpath to receive the waste heat recovery airflow.

2. The gas turbine engine of claim 1, wherein the heat source exchanger is coupled to or integrated with the turbine rear frame.

3. The gas turbine engine of claim 1, wherein the turbine rear frame comprises a plurality of circumferentially-spaced vanes, and wherein the heat source exchanger is axially located at least partially between first and second vanes of the plurality of vanes.

4. The gas turbine engine of claim 1, wherein the turbine rear frame comprises a plurality of circumferentially-spaced vanes and a plurality of fairings, and wherein each fairing is coupled to a respective vane.

5. The gas turbine engine of claim 4, wherein the waste heat recovery system includes a divider operable to define a primary exhaust flowpath for the primary exhaust airflow and a waste heat recovery flowpath for the waste heat recovery airflow, and wherein the heat source exchanger is coupled to or integrated with a respective fairing.

6. The gas turbine engine of claim 1, further comprising a core cowling having a vent, wherein the waste heat recovery airflow is exhausted through the vent in the core cowling.

7. A gas turbine engine comprising:
   a compressor section, a combustion section, a turbine section, and an exhaust section in serial flow order and together defining a core air flowpath;
   a turbine rear frame extending through the core air flowpath at a location downstream of the turbine section;
   a divider operable to define a primary exhaust flowpath and a waste heat recovery flowpath, wherein at least a portion of the divider is axially located corresponding to a leading edge of the turbine rear frame; and
   a heat source exchanger positioned in thermal communication with the waste heat recovery flowpath and coupled to or integrated with the turbine rear frame.

8. The gas turbine engine of claim 7, wherein a leading edge of the divider is axially located forward of a leading edge of the turbine rear frame.

9. The gas turbine engine of claim 7, wherein the turbine rear frame comprises a plurality of circumferentially-spaced vanes, and wherein the heat source exchanger is axially located at least partially between first and second vanes of the plurality of vanes.

10. The gas turbine engine of claim 7, wherein the turbine rear frame comprises a plurality of circumferentially-spaced vanes and a plurality of fairings, and wherein each fairing is coupled to a respective vane.

11. The gas turbine engine of claim 10, wherein the heat source exchanger is coupled to or integrated with respective fairings.

12. The gas turbine engine of claim 7, further comprising a core cowling, wherein the waste heat recovery flowpath comprises an exhaust vent in the core cowling.

13. The gas turbine engine of claim 7, wherein an inlet of the heat source exchanger is axially located forward of an aft edge of the turbine rear frame.

14. The gas turbine engine of claim 7, wherein the turbine rear frame comprises a plurality of circumferentially-spaced vanes, and wherein each vane includes a forward fairing and an aft fairing.

15. The gas turbine engine of claim 14, wherein the heat source exchanger is coupled to a respective vane and integrated with a respective forward fairing and a respective aft fairing.

16. A gas turbine engine comprising:
   a compressor section, a combustion section, a turbine section, and an exhaust section in serial flow order and together defining a core air flowpath, the core air flowpath having a turbine rear frame extending through the core air flowpath at a location downstream of the turbine section, the turbine rear frame defining a leading edge within the core air flowpath, wherein the turbine rear frame comprises a plurality of circumferentially-spaced vanes and a plurality of fairings, and wherein each fairing is coupled to a respective vane; and
   a waste heat recovery system operable to separate, at or upstream of the leading edge of the turbine rear frame, a core airflow exiting the turbine section into a primary exhaust airflow and a waste heat recovery airflow, the waste heat recovery system comprising a heat source exchanger positioned to receive the waste heat recovery airflow, wherein the waste heat recovery system includes a divider operable to define a primary exhaust flowpath for the primary exhaust airflow and a waste heat recovery flowpath for the waste heat recovery airflow, and wherein the heat source exchanger is coupled to or integrated with a respective fairing.

17. A gas turbine engine comprising:
a compressor section, a combustion section, a turbine section, and an exhaust section in serial flow order and together defining a core air flowpath;
a turbine rear frame extending through the core air flowpath at a location downstream of the turbine section, wherein the turbine rear frame comprises a plurality of circumferentially-spaced vanes, and wherein each vane includes a forward fairing and an aft fairing;
a divider operable to define a primary exhaust flowpath and a waste heat recovery flowpath; and
a heat source exchanger positioned in thermal communication with the waste heat recovery flowpath and coupled to or integrated with the turbine rear frame.

18. A gas turbine engine comprising:
a compressor section, a combustion section, a turbine section, and an exhaust section in serial flow order and together defining a core air flowpath, the core air flowpath having a turbine rear frame extending through the core air flowpath at a location downstream of the turbine section, the turbine rear frame defining a leading edge within the core air flowpath;
a waste heat recovery system operable to separate, at or upstream of the leading edge of the turbine rear frame, a core airflow exiting the turbine section into a primary exhaust airflow and a waste heat recovery airflow, the waste heat recovery system comprising a heat source exchanger positioned to receive the waste heat recovery airflow; and
a core cowling having a vent, wherein the waste heat recovery airflow is exhausted through the vent in the core cowling.

* * * * *